(No Model.) 2 Sheets—Sheet 1.
C. F. SHEDD.
COMBINED STALL AND STOCK HANDLING APPARATUS.
No. 397,206. Patented Feb. 5, 1889.
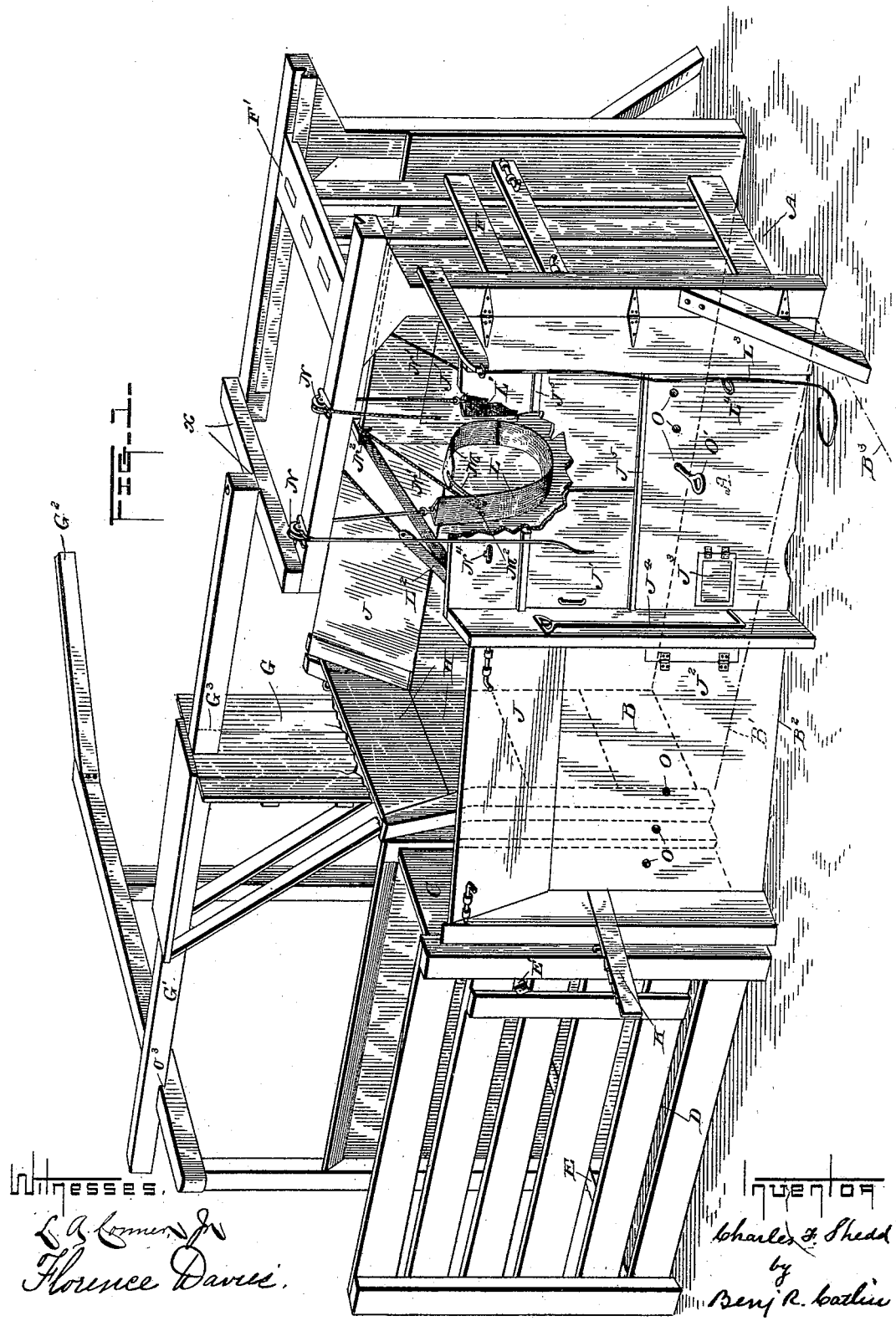

(No Model.) 2 Sheets—Sheet 2.
C. F. SHEDD.
COMBINED STALL AND STOCK HANDLING APPARATUS.
No. 397,206. Patented Feb. 5, 1889.
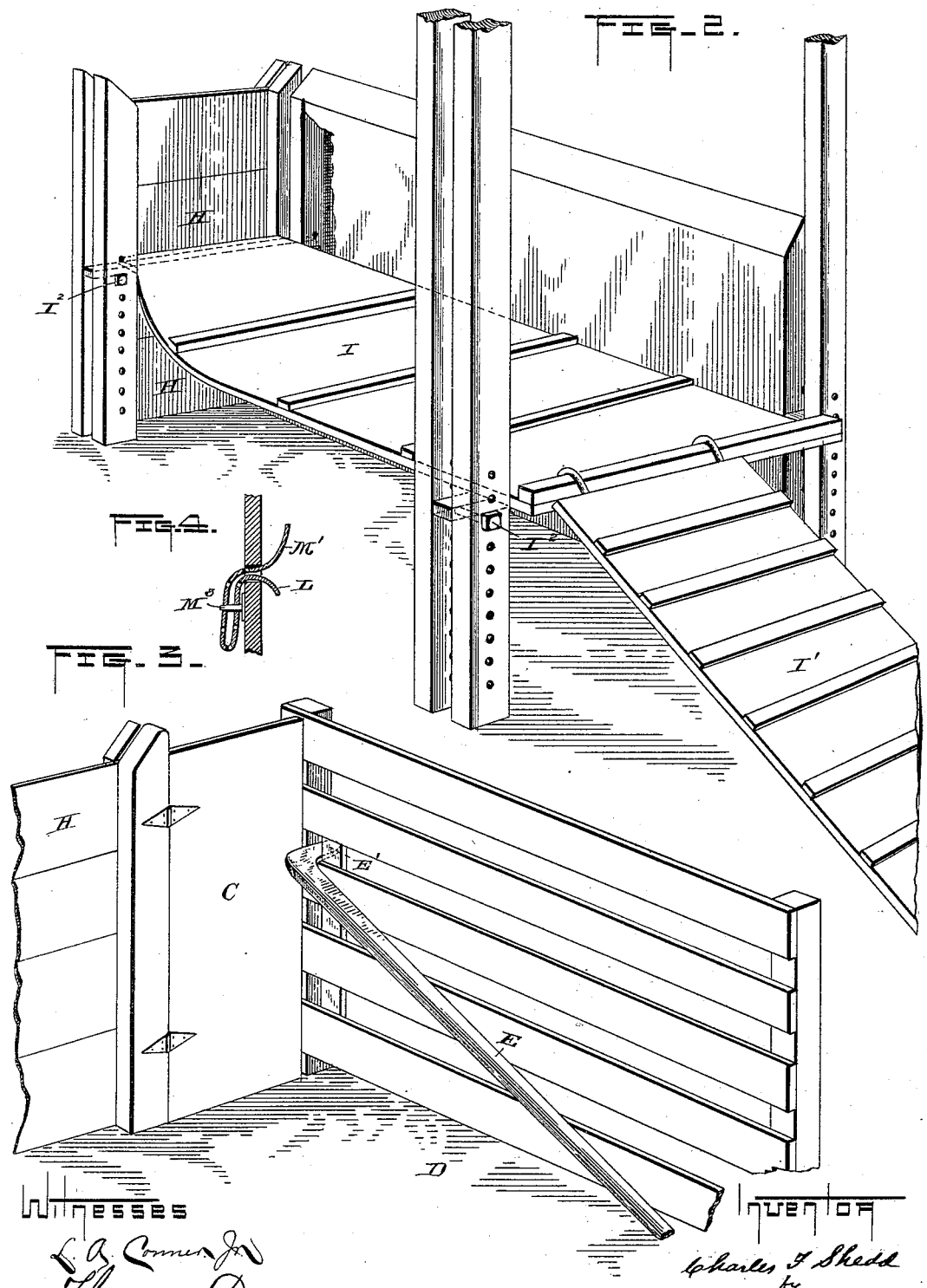

UNITED STATES PATENT OFFICE.

CHARLES F. SHEDD, OF FAIRFIELD, NEBRASKA.

COMBINED STALL AND STOCK-HANDLING APPARATUS.

SPECIFICATION forming part of Letters Patent No. 397,206, dated February 5, 1889.

Application filed March 12, 1888. Serial No. 267,013. (No model.)

*To all whom it may concern:*

Be it known that I, CHARLES F. SHEDD, a citizen of the United States, residing at Fairfield, in the county of Clay and State of Nebraska, have invented certain new and useful Improvements in Combined Stall and Stock-Handling Apparatus; and I do hereby declare the following to be a full, clear, and exact description of the invention, such as will enable others skilled in the art to which it appertains to make and use the same.

The object of my invention is to provide means for handling horses and other animals for veterinary, breeding, taming, or other purposes, to effect which it is desirable to possess entire and safe control of the position and movements of the animal; and the invention consists in apparatus and in parts thereof hereinafter described, and particularly pointed out in the claims.

In the accompanying drawings, which form part of this specification, Figure 1 is a perspective view of the apparatus, including an attachment embracing a removable door, the lower part of which is represented as broken away. Fig. 2 is a perspective view of a part of the apparatus, taken from the rear. Fig. 3 is a sectional view of the chute, and Fig. 4 is a view of a detail indicating means for securing a belt.

In the several figures like letters refer to like parts.

A indicates a stall, and B a hinged door, which constitutes a side of the same, dotted line B' indicating the position of the door when closed. Its position, when prepared for the admission of a horse or other animal to the stall from chute or passage D, is shown in full lines at $B^2$. When the animal is to be dismissed from the stall, the door B is opened to the position indicated by dotted line $B^3$. The chute D is located outside the plane of the door or hinged side B when the latter is in its closed position, (indicated by dotted line B',) and is provided with a door, C, which can be locked by the pole E, having a side extension, E', which is adapted to enter an opening in the side wall of the chute near the door. The opposite end of the pole may rest on the ground, or it may be supported and held by the side wall in any convenient manner. This pole is used to drive the animal from the open lot into the chute, and thence into the stall, and may then be immediately used to close and secure door C. The door B should be at a position indicated by line $B^2$ until the animal enters the stall from the chute, when it is immediately closed by a helper and locked in closed position at line B', preferably by a spring-lock. The elastic bar K, secured to the door and provided at its outer end with notches or teeth to engage a suitable stop on the frame of the chute, as indicated, is well adapted for this purpose.

The stall A is closed in front by a sliding door, F. This door may be supported to slide upon ways in any known manner. As shown in the drawings, an upper cross-bar is extended laterally beyond the vertical edges of the door and provided on the under side of these extensions with bearings that fit in corresponding ways on the upper beams of the stall. The door thus made can be moved lengthwise of the stall and secured in any desired position by pins or bolts attached to the door and arranged to slide into corresponding holes in the walls of the stall, a convenient number being provided for this purpose. The rear end of the stall is closed by removable planks H. For some purposes herein described, however, I may use an attachment embracing a door, G, supported and made adjustable on beam G'. This door is represented in Fig. 1 with its lower part broken away to permit illustration of the planks. As will be understood, the planks and door are not designed to be used simultaneously. The latter may be braced, as represented, and the upper part of the door and of the inclined brace provided with slots to receive beam G'. This beam is pivoted at its front end to a cross-beam, X, on the rear of the stall. The opposite end of the beam G' is supported on a frame, as shown, and rests, preferably, in a slot cut in the upper cross-beam, as indicated at $O^3$. An extension of this cross-beam is indicated by $G^2$. The bar G' can be lifted out of the notch in the frame, if a notch is used, and then swung around its pivot at X until its rear end rests on the extension $G^2$. At such time the movable plank or partition-pieces H H H can be inserted in the space between parallel posts. As shown in Fig. 1, the door G is simply moved back on its supporting-bar G'; but in practice, when planks H are in use, bar G' will be swung aside, as above stated.

I is a vertical adjustable platform supported on movable rods or bars I², and I' is a gangway, which can be placed in inclined position, so that a jack or stallion can be led upon the platform, for a purpose hereinafter set forth.

J J indicate hinged side pieces which are adjustable and can be set in upright position or at an angle, or dropped down, as desired.

J' J' indicate sliding doors or windows, one on each side of the stall, which are supported and move in ways formed by angular cleats J⁵, being a well-known construction; and J² J³, small doors closing openings through which a hook or other instrument may be introduced for purposes to be described.

L L' indicate wide belts secured at one end to the side of the stall and arranged to pass under the animal for the purpose of sustaining its weight.

L² is a breech-belt.

M M' are belts arranged to pass over the back of the animal to hold him down. These belts, if desired, may be each in one piece with belts L and L', respectively, and secured to the stall at their junction; or they may be made separate, each being secured to the stall at their contiguous ends on one side.

N N are pulleys, over which cords pass for raising the belts L and L', and N' N' are ropes for drawing down the belts M M'. Ropes are attached to the free ends of the several belts. Instead of pulleys, a rounded surface might be provided for the ropes to be drawn over by any convenient means.

O O are openings to receive the rods or bars O', which may be inserted either in the front or rear of the animal in the stall, the rods extending across the same and through corresponding openings in the other side. By this means an animal under treatment may be prevented from moving forward or backward, as various operations require. The inclined arrangement of the holes O provides for inserting the rod at different elevations and at different distances from the front of the stall, according to the size of the animal.

L³ is a rope for drawing and holding the animal's right hind foot forward, upward, and outward, as hereinafter described.

Whenever it is necessary to put the animal in the sling, as in castrating or in doctoring, the gate B is set at the line B², and gate F is set at F', near the front of the stall, and gate G at G³, (the partition-planks H H being out of the way and the free ends of belts L L' being dropped.) The animal is run from the open lot through the chute D, followed by the operator carrying the locking-pole E. As the animal passes out of the chute, the operator catches the door C with the pole, closing and locking it with the hook E'. A second operator pushes the door B to the line B', and it is locked by the spring locking-bar K. The front gate, F, is then set, according to the length of the animal, to bring it in proper relation to the belts L and L'. The rear gate, G, is pushed forward to hold the animal firmly in its proper place. The belts L and L', being attached to adjustable staple-clamps or other devices for securing the same, one form of which is indicated in Fig. 4, are set to suit the height of the animal. A hook or other implement—such as shown suspended at J⁴—is passed through the opening ordinarily closed by doors J³ or J² to catch the dropped ends of the belts L or L', and they are then attached to the ropes which pass over the pulleys N N, the drop-door J or slide-door J' being opened for the purpose. The ropes N' N' are next passed through the rings M² in the belts L and L' and drawn back and fastened, for which purpose pins similar to that shown at N⁴ may be provided. Cable chains can be used in place of the ropes, being wound over a windlass or passing through pulleys and raised by horse-power and locked by any suitable key or fastening when the proper height of the belts L L' has been attained. The breeching-strap L² can be used as shown. The animal being in the sling, the side door, B, can be opened to dotted line B³ and the rear door, G, pushed back out of the way. If the animal is to be castrated, the free end of the rope L³ is passed around its right hind foot or leg, preferably at the pastern, and put through the ring L⁴, and the foot drawn outward, forward, and upward by pulling on the end of the rope. An attendant can thus hold the animal's leg in an elevated position, the rope L³ being kept taut, enabling the operator to do his work easily and rapidly, after which the doors are all set back to their original places and the belts are dropped, leaving the animal on his feet. Door B is again opened to dotted line B³, and the animal passes quietly out into an open lot. It is obvious that the particular means of hinging or supporting the door or side B is not material to the operation just described.

In breeding, the mare is run into stall A, as heretofore described. The movable partition-planks H H are used instead of the sliding door G. The beam upon door G slides, being thrown around out of the way. A "teaser" is brought to the slotted door F to try the mare, and, if ready for service, she is pushed back against the partition H H by moving the door F. The hinged doors J J are set at an angle, so as not to interfere with the front feet of the stallion or jack as he serves the mare. The adjustable platform I is set to suit the height of the animals. One or more of the partition-planks H H are removed, the stallion or jack is led up the gangway I' onto the platform I, and serves the mare, after which door B is opened to B³ and she is allowed to walk out.

In harnessing an animal it is run into stall A, as described, and haltered. The harness is then dropped onto it from above, and the bellybands drawn up by means of a hook passed through the openings J², ordinarily closed by doors J³, and buckled through openings usually closed by doors J and J'. The bitting-rig or saddle can be put on in a similar manner.

To brand an animal, it is run into the stall A, as before described, and branded through the openings normally closed by doors J or J', or through other openings, which can be provided if found convenient.

In roaching and trimming mules the mule can be forced back against planks H H by sliding the door F on its supports, and the tail easily trimmed after removing one or more of the planks H H. The mane can be roached through the openings which preferably are usually closed by doors J or J'.

In doctoring, drenching, giving injections, or attending to its teeth the animal can be safely handled. The front door, F, can be removed and one or more round bars O' used to hold the animal for any work about its head or mouth, said rods being inserted through holes O, any number of which may be suitably provided. In treating distemper or similar diseases medicinal substances can be burned under the animal's nose, the stall being covered with a canvas or blanket to retain the fumes of the substance burned until the animal has inhaled as much as desired.

I am aware that stalls have been provided with hinged sides, and thus a movable door has been employed to crowd an animal toward the front of a stall, and I do not claim such devices, broadly.

In my construction the hinged side can be partially opened and arranged to act as a guide or as a continuation of the chute when it is desired to drive an animal through the latter into the stall. The planks at the rear of the stall are made separately removable, to afford convenient access to animals of different sizes for the purposes above named, and either the sliding door at the front or the rod O', which can be placed in either pin or oppositely-located holes O, according to the size of an animal under treatment, affords means for holding the animal at the rear of the stall.

Having thus described my invention, what I desire to claim and secure by Letters Patent is—

1. A stall provided with a side, B, hinged at the front corner of said stall opposite to chute D to open outwardly, in combination with the chute located outside the plane of the closed position of the hinged side, substantially as specified.

2. A stall provided with a side, B, hinged at the front corner of said stall opposite to chute D to open outwardly, in combination with the chute located outside the plane of the closed position of the hinged side, and provided with the door C, substantially as specified.

3. A stall provided with a side, B, hinged at the front end of the stall opposite to chute D to open outwardly, in combination with the chute provided with the door C, located outside the plane of the closed position of the hinged side, and a locking-pole, substantially as specified.

4. In a stall provided with the downwardly and backwardly inclined series of holes O, located in each side near the front of the stall, the combination of a bar or rod fitting said holes and removable planks H for the rear of the stall, substantially as specified.

5. A stall provided with removable planks H, sliding door F, and adjustable doors J J, in combination with a vertically-adjustable platform and gangway, substantially as specified.

6. For use in harnessing, haltering, bitting, and saddling, the stall provided with the sliding front door and with doorways in a side, and having oppositely-placed series of holes O near its rear, and a rod, O', fitting said holes, substantially as specified.

7. The stall provided with doorways in its sides, having the front sliding door, F, and removable planks H at the rear, for use in roaching and trimming mules, substantially as specified.

8. In a stall provided with sides oppositely perforated near the rear, the combination of a bar or rod adapted to fit the perforations, and a sliding removable door, F, whereby the animal may be held to have his teeth or mouth operated on or to be drenched, substantially as specified.

9. The stall provided with the front door, F, movable lengthwise of the stall, and with separately-removable planks H H for use in administering injections, substantially as specified.

10. In a stall having a removable side provided with small doorways, slinging-belts, and a rope, L³, having ring L⁴, said rope being secured to the stall near its front, substantially as specified.

In testimony whereof I affix my signature in presence of two witnesses.

CHARLES F. SHEDD.

Witnesses:
  J. W. CARTER,
  JAMES C. HYSLOP.